W. S. WESTON.
HYDRAULIC TRANSMISSION MECHANISM.
APPLICATION FILED JULY 5, 1917.

1,420,798.

Patented June 27, 1922.
2 SHEETS—SHEET 1.

Witnesses:—
J. G. Anderson
G. M. Haglund

Inventor:—
William S. Weston
By Pierce Fisher & Clapp

W. S. WESTON.
HYDRAULIC TRANSMISSION MECHANISM.
APPLICATION FILED JULY 5, 1917.

1,420,798.

Patented June 27, 1922.
2 SHEETS—SHEET 2.

Witnesses:—
J. G. Anderson
B. M. Hagenow

Inventor:—
William S. Weston
By Pense Fisher & Clapp
Attys.

UNITED STATES PATENT OFFICE.

WILLIAM S. WESTON, OF HOUSTON, TEXAS.

HYDRAULIC TRANSMISSION MECHANISM.

1,420,798.  Specification of Letters Patent.  Patented June 27, 1922.

Application filed July 5, 1917. Serial No. 178,571.

*To all whom it may concern:*

Be it known that I, WILLIAM S. WESTON, a citizen of the United States, residing in the city of Houston, county of Harris, and State of Texas, have invented certain new and useful Improvements in a Hydraulic Transmission Mechanism, of which the following is a full, clear, and exact description.

My invention relates to a hydraulic transmission mechanism or traction equalizer for automobiles or other motor driven vehicles designed to be used in the place of the mechanism commonly known as the differential, and comprises, fundamentally, two permanently closed hydraulic clutch mechanisms for transmitting the motive power to the two traction wheels and means whereby a self-regulating balance of the hydraulic pressure in these clutch mechanisms is utilized to give and maintain an equal transmission of power to both wheels during normal safe working conditions.

The object of my invention is to provide a traction equalizing device which will allow a free relative movement of the two traction wheels when running the ordinary course of a trackless roadway, either fast or slow, or when turning sharp corners or turning around at slow speed, but which will not permit one wheel to race on ice or slippery pavement or for any other cause when the other wheel is struck or moving relatively slow.

The essential elements in the construction of a device whereby I attain this object, together with other novel details of construction of importance in the practical operation of a hydraulic clutch or power transmission mechanism are hereinafter fully described and clearly illustrated in the accompanying drawings which form a part of these specifications, and the elements of novelty are particularly pointed out in the claims.

Figure 1:
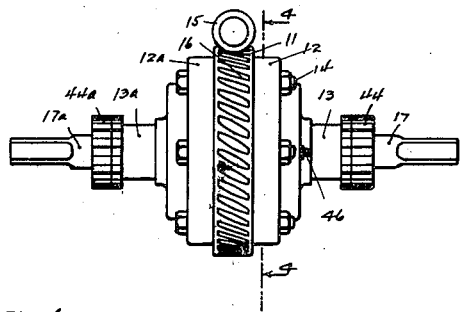
Figure 2:
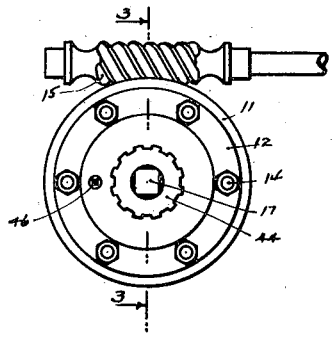
Figure 3:
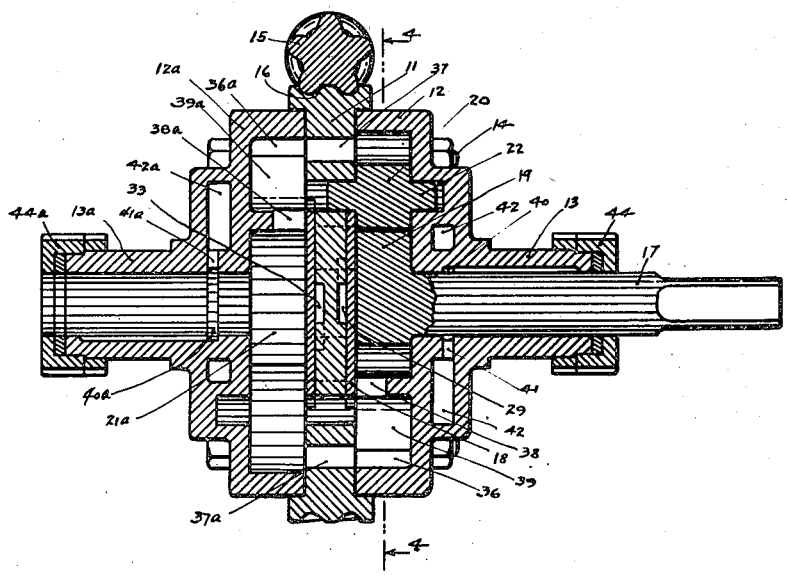
Figure 4:
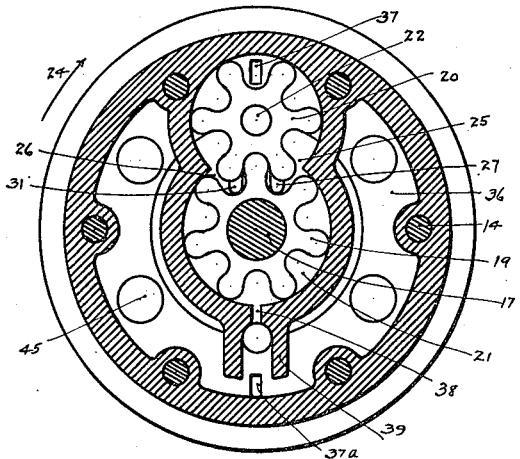
Figure 10:
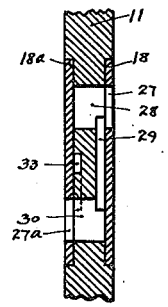
Figure 7:
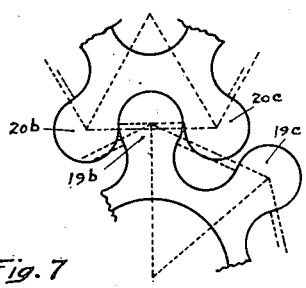
Figure 8:
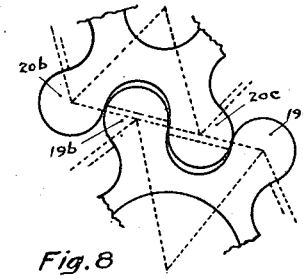
Figure 9:
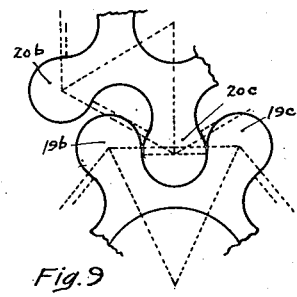

Fig. 1 is a rear elevation of my invention and Fig. 2 an end elevation from the right of Fig. 1, both drawn to a smaller scale than the balance of the figures. Fig. 3 is a vertical longitudinal section on the line 3—3 of Fig. 2 with the axle and gears of the left hand end omitted. Fig. 4 is a transverse section on the line 4—4 of Figs. 1 and 3, Fig. 5 a transverse section through the bolts on the parting line between the right hand end casting and the worm gear disk, and Fig. 6 a transverse section through the bolts on the parting line between the worm gear disk and the left hand end casting, all three views being taken from the right of Fig. 1. Figs. 7, 8 and 9 are diagrammatic illustrations of successive positions of the intermeshing teeth of improved spur gear pump gears. Fig. 10 is a partial sectional view of the worm gear disk on the line 10—10 of Fig. 5. The same numerals and letters of reference indicate the same parts in the several views.

The construction illustrated in Figs. 1 and 2 will readily be recognized as designed to occupy the place of the well known worm driven differential casing ordinarily supported in the rear axle housing of an automobile or motor truck. As the housing and supporting bearings are not elements in the invention and are not essential to its clear description they are not shown in the drawings and will not be described further. The traction wheels, being detachable from their axles as ordinarily constructed, are also omitted from the drawings and the traction axles are shown short with the ends squared for any suitable extension and connection with their wheels.

The construction first described in general terms, comprises a power driven rotatable casing concentric with two traction axles; two separate sets of spur gear pump gears carried by the casing in separate liquid tight recesses with one gear of each set attached to a traction axle; a small channel or passage connecting the compression sides of the two sets of pump gears; and a second small channel or passage connecting the suction sides. The construction is such that, with the interdental spaces of the gears either completely or partly filled with a liquid medium, a driven rotative movement of the casing is transmitted to the traction axles through a hydraulic pressure developed on the compression sides of the two sets of pump gears, while any normal variation in the relative rotative movement of the axles is taken care of by an equalization of the pressure through the connecting passage. This equalization is accomplished by a flow of the liquid medium through the passages. To attain a primary purpose of my invention these passages are made small so as to constrict the flow and limit the equalization of pressure approximately to those variations in the relative speed of the axles required in safe working operation.

In another and still more general statement of the construction, and one which will be understood readily by any one familiar with the art in hydraulic clutches, the device may be described as comprising a combination of two permanently closed hydraulic clutches in which the casings constituting the driving members are made integral to drive as a unit, and in which the shafts or axles constituting the driven members are balanced in their interlock with the unit driving member by a possible flow of the liquid medium through a passage connecting the compression sides of the two clutches.

Referring to Figs. 1 and 3 of the drawings it is to be noticed that the device is symmetrical and that the opposite axles and ends are duplicates. Parts on the left hand end which are duplicates or equivalents of parts on the right are therefore given the same reference numeral with the suffix small letter "a."

The rotatable casing comprises a centrally located disk 11 and end castings 12 and 12$^a$ having hubs or journals 13 and 13$^a$ all bolted together with bolts 14. The casing is driven by a worm 15 intermeshing with a worm gear 16 on the thickened periphery of the disk 11. Through the opposite hubs and in perfect alignment with each other and the axis of the casing extend the traction axles 17 and 17$^a$. Within the casing and let into the opposite faces of the disk 11 are plates 18 and 18$^a$, having ports leading into and covering passages to be described hereinafter. Within each end casting and facing the disk is a pair of spur gear pump gears 19, 20, and 19$^a$, 20$^a$, respectively in ends 12 and 12$^a$, located in complete figure 8 recesses 21 and 21$^a$, having a liquid tight conformation with the gears. See Figs. 4 and 6. Gears 19 and 19$^a$ hereinafter called the primary gears, are concentric with the inner ends of the traction axles and preferably made integral therewith. Gears 20 and 20$^a$, called the secondary gears are journalled free in the end castings and central disk on pins 22 and 22$^a$ which are preferably made integral with the gears. Secondary gear 20$^a$ is located diametrically opposite secondary gear 20, against the opposite face of the disk.

Figure 6:
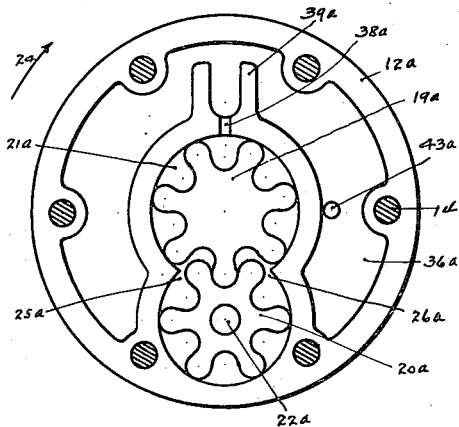

Referring now to Figs. 4 and 6 a rotation of the casing on the concentric axis of the axles would tend to carry the secondary gears in a planetary movement around the primary gears. The construction is the same for driving either forward or backward, but for clearness in the description the rotative movement of the casing for a forward movement only of the car will be considered and is indicated by the arrow 24 in the several figures. With the interdental spaces completely or partly filled with a liquid medium, the rotation indicated would produce hydraulic pressure on one side of the gears and establish a region of compression in the vicinity where they intermesh, as at points 25 and 25$^a$, and a suction on the opposite side at points 26 and 26$^a$. At compression point 25 a port 27 in plate 18 registers with an opening 28 in the disk that is connected by a channel or passage 29 with another opening 30 that registers with port 27$^a$ in the opposite plate 18$^a$ located in front of compression point or region 25$^a$ of gears 19$^a$ and 20$^a$. The channel 29 is made relatively small in cross-section, but up to the limit of unconstricted flow of the liquid therethrough the compression in the two gear recesses will be balanced and the power transmitted equally to both axles. Similarly suction point 26 is connected with suction point 26$^a$ by a port 31 of plate 18, an opening in the disk in line therewith, a channel 33, and an opening 34 in the disk, all leading to a port in plate 18$^a$ opposite suction point 26$^a$.

Figure 5:
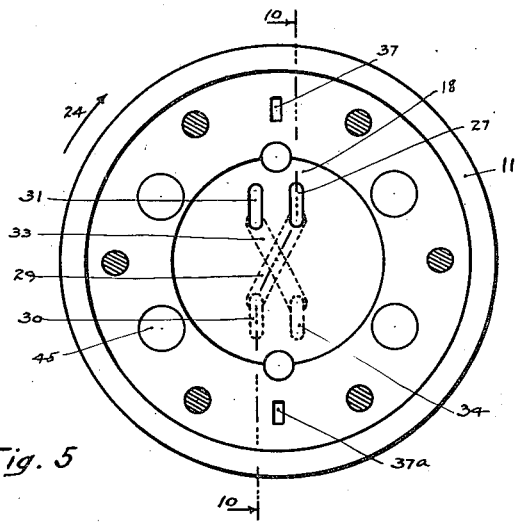

The ports 27 and 31 as shown in Figs. 4 and 5, are located in the side walls of the gear recesses and at a distance apart approximately equal to the width of an interdental space to avoid leakage from one to the other as the teeth and spaces pass, and yet each is large enough and close enough to the medial line of the intermeshing gears to connect with the spaces as they approach or recede from that line. This prevents any appreciable amount of trapping of the liquid medium, which is practically incompressible, in the bottom of the interdental spaces at a closing-in moment as indicated in Fig. 8.

The operation of the device is as follows: Referring to Figs. 4 and 6 taken in connection with the rear view of the device shown in Fig. 1; if it is assumed that the automobile is turning to the right then the casing will rotate faster than the right hand axle and slower than the left; that is, the secondary gear 20 will have a slight relative forward movement about its primary 19 in the direction indicated by the arrow while the secondary gear 20$^a$ will have a slight relative backward movement about its primary 19$^a$. The forward movement of gear 20 is accomplished with the pumping of a small quantity of liquid through the channel 29 and its connecting openings, the quantity being just enough to accommodate the backward movement of gear 20$^a$. A statement which may help to explain the action is this:—So far as the small quantity of liquid flowing through channel 29 is concerned gears 19 and 20 act as a pump against gears 19ª and 20ª acting as a hydraulic motor, although both sets of gears continue to perform their functions as a part of a permanent clutch mechanism for rotating the axles in the same direction as the casing. Under normal running conditions the arithmetical average speed of the axles is equal that of the casing except for the loss due to leakage.

While the hydraulic traction equalizer is used in the place of a differential, yet its construction is such that it cannot be considered a true differential in the sense of forming a positive connection between the two axles. A relative backward movement of one axle is not necessarily accompanied all the time by an equal forward movement of the other axle. Under an abnormal speed of turning, that is, a speed at which there may be some danger of the machine being overturned, the restriction of flow of liquid through the channel 29 holds the rate of rotation of the casing within a moderate maximum over that of the slow axle while the fast axle is free for a short period of operation to have its speed rapidly increased by the reaction of the road through the traction wheel. The truth of this last statement is explained in this way. During periods when the car is running practically straight forward the liquid will be found only on the compression sides of the gear recesses and substantially a vacuum on the suction sides. This condition is brought about by a gradual leakage around the primary gears through the bearings of the axles. Because of this vacuum on the suction side the fast moving axle may advance faster than the compression side of its gears can be filled from the opposite set, resulting in the compression side becoming for the moment a suction side with a vacuum. As soon as the abnormal turning movement comes to an end the balance is restored. During the above described action the equilibrium between the suction regions 26 and 26ª is reestablished through the channel 33. It may be noted in its connection that with means for replenishing the leakage a continued turning movement would cause both sides of the gear recesses to become filled with the liquid medium.

Means for replenishing the leakage and keeping the compression sides of the gear recesses full of liquid is an essential element in a practically operative device. To this end I provide large storage chambers 36 and 36ª connected to the gear recesses by ports 37, 38 and 37ª, 38ª at the top and bottom of the figure 8 contour at points most remote from regions of compression and suction. Ports 38 and 38ª are extended toward the outer circumference of the storage chambers by wings 39 and 39ª. In operation all the ports are submerged by the liquid being held to the circumference by centrifugal force, and as an interdental space with a complete or partial vacuum comes into line it is filled by the liquid.

The liquid used in the device is preferably a moderately viscous lubricating oil that will not congeal at ordinary low temperatures. The leakage through the bearings of the axles 17 and 17ª is returned to the storage chambers by centrifugal force from oil grooves 40, 40ª, ducts 41, 41ª, supplementary chambers 42, 42ª, and ducts 43, 43ª. Duct 43 from chamber 42 to chamber 36 is located immediately back of the tap plug 46 shown in Fig. 2. Any material amount of leakage is prevented from reaching the exterior by the stuffing-box caps 44, 44ª on the ends of the hubs 13, 13ª. A surplus of liquid in the supplementary storage chambers 42, 42ª which extend entirely around the hubs and have an average smaller diameter than the main chambers, serves to maintain the latter chambers full for a considerable length of time. The main storage chambers are connected through the disk 11 by large holes 45, and may be considered as one chamber.

For the practical operation of a hydraulic mechanism like that described which is dependent on the function of a pair of spur gear pump gears a very great essential is that the percentage of leakage not only around the gears and bearings but also through the intermeshing shall be the smallest possible. I have therefore provided a type of gear having a relatively small number of large teeth so shaped that they will always have two lines of contact in their intermeshing relation. All lines of contact may be made as tight as in a close fitting journal, and because of the large size of the teeth the volume of the liquid in the interdental spaces is large in proportion to the leakage area.

The gear teeth illustrated in the drawings are full cylindrical in shape at the ends and the interdental spaces have a cylindrical contour at the bottom so that when completely intermeshed the tooth of one gear will momentarily fit the bottom of an interdental space of the other gear as in a journal. The cylindrical surface of the tooth reverses into the surface of the bottom of the indentation with a short tangent between. Tangent surfaces on opposite sides of the indentation are parallel and their distance apart is equal to the diameter of the cylindrical tooth for a liquid tight fit. The length of the tangent surface represents the space through which the tooth of one gear has a genuine piston action in the indentation of the companion gear. It will be comprehended that the piston action is constantly present as the gears roll on one another, changing from the tooth of one gear to the incoming tooth of the other gear. This construction precludes lost motion and a consequent leakage between the gears.

Referring to Figs. 7, 8 and 9; $19^b$, $19^c$ are teeth of primary gear 19; and $20^b$, $20^c$ are teeth of secondary gear 20. In Fig. 7 tooth $19^b$ has a piston tight fit in the bottom between teeth $20^b$ and $20^c$. Fig. 8 represents a next state in a relative planetary movement of the secondary gear about the primary. In this figure tooth $19^b$ is at the point of coming out of a piston tight fit while tooth $20^c$ is at the point of entering into a piston tight fit between teeth $19^b$ and $19^c$. That both teeth, $19^b$ and $20^c$, have momentarily a piston tight fit will be apparent if the relation and movement of imaginary lines connecting the centers of the teeth in each gear are noted. In the momentary position of Fig. 8 there are three lines of contact between gears. At other times there are two lines of contact with a momentary cylindrical surface contact in the bottom of the indentation. Fig. 9 represents the next stage where tooth $20^c$ has reached the bottom of the indentation between teeth $19^b$ and $19^c$.

If the centers of the teeth are connected to each other and to the center of the gear by lines, an equilateral polygon will be formed on each gear composed of a number of isosceles triangles equal in number to the number of teeth. That portion of the surface on each side of the tooth which has a rolling, sliding contact is limited to, and measured by, the external angles of the sides of the polygons extended.

A feature to be noted, although not of importance as affecting my present invention, but distinguishing my type of gear from the standard machine gear having cycloidal or involute contact surfaces, is that the rate of rotative movement of the secondary gear on its axis is not constant for a constantly uniform planetary movement about the primary. In Fig. 7 the secondary is impelled by tooth $19^b$ journaled between teeth $20^b$ and $20^c$, while in Fig. 9 it is impelled by a thrust on its own tooth $20^c$ journaled between teeth $19^b$ and $19^c$ at a greater distance from the axis of rotation. The statement of fact is that for a uniform planetary movement of the secondary about the primary gear the relative angular movement of the secondary is faster for the position of Fig. 7 than for that of Fig. 9, and increases and decreases at the passing of every tooth.

The resultant rhythmic movement or impulse thus set up between the gears makes the use of the cylindrical tooth in both gears practically prohibitive in all construction where power is to be transmitted or work done through the actual intermeshing movement of the gears, unless provision is also made to absorb this rhythmic action before it reaches the machinery to be driven, or the work to be done. In hydraulic clutches of the spur gear pump type, the gears are interlocked against intermeshing movement, as that movement is ordinarily understood, and in a manner such that the power or rotative motion transmitted from the driving member to the driven member is directly proportional to the efficiency of the interlock. In my traction equalizer, the actual intermeshing action necessary to balance the tractive effect in the two driven members is restricted by the size of the passage between the two compression sides of the device and is so slow compared with the rotative movement of the gears interlocked as a unit, that the rhythmic effect may be neglected.

In construction the extreme ends of the teeth are preferably flattened for a short length of arc to conform to the circumference of the whole gear and furnish a surface instead of a line contact on the periphery of the gear recesses. It is to be noted that only that portion of the tooth which has a rolling sliding movement on the short tangent surfaces needs to be cylindrical in shape. I prefer however, to retain nearly the full cylindrical end because of the larger volume of liquid that will have to be displaced. It is further to be noted that the bottom of the interdental space below the short parallel surfaces may be larger than is required for the intermeshing tooth end without affecting the liquid-tight fit of the gears.

The type of new and improved gear described in the preceding paragraphs is simpler to lay out than the standard machine gear with involute or cycloidal curves, particularly the form illustrated having substantially full cylindrical surfaces throughout. It is sufficient for the mechanic that he should know the methods of procedure, and the conditions governing the intermeshing relation.

One method is as follows: The diameter of the teeth and their number having been determined, the outlines of the gears are laid down and brought together with half a side of one polygon coinciding with half a side of the other polygon, thereby establishing the distance between the gear centers. This distance then may be obtained either graphically or by a trigonometrical computation. Having obtained the center distance, the diagrams of Figs. 7 and 9 are next used for determining the necessary depth of the interdental spaces. Another method, when external conditions may fix the center distance of the gears, would be to decide on the number of teeth in each gear and then by the aid of the Fig. 8 diagram with this known center distance and the angles, their dimensions being determined from the number of the teeth, figure the exact diameter of the teeth.

With six full teeth in the secondary gear and seven in the primary, and set to a center distance which will give the relation shown in Fig. 8, the teeth will clear one another in the intermeshing movement. A demonstration of this fact by analytical mathematics will also reveal that as few teeth as five or as many as eight in the primary will clear. Now, although a wide range in the ratio of the teeth of the gears is not necessary or desirable in the construction of my device, I do not care to limit myself to a ratio between 6 to 5 and 6 to 8. Referring to Fig. 8, a study of that diagram will disclose the fact that the centers may be moved away from each other a considerable amount in a direction perpendicular to the line common to both polygons and still have three lines of contact sufficiently tight for all practical purposes. This possible variation is a margin of convenience for the manufacturer and can be used to widen the limitation to the ratio of the number of teeth with full cylindrical ends. To illustrate, it may be stated that by moving the gear centers away from each other in the direction above specified an amount equal to thirteen one thousandths (.013) part of the diameter of the tooth as many as twenty full teeth may be used in the primary. I do not limit myself in the use of the cylindrical gear tooth, with two diametrically opposite lines of constant contact, to the hydraulic traction equalizer hereinbefore described, but claim its use broadly in all devices where its function is that of a spur gear pump gear whereby power is transmitted by the interlocking of the gears through the agency of a liquid medium. I am aware that engineers and draftsmen, when illustrating intermeshing gears, have frequently shown both gears with more or less cylindrically-shaped teeth; but I am not aware that such teeth provided on opposite sides with true cylindrical surfaces adapted to have a rolling, sliding contact between short parallel faces in the interdental space of the companion gear, have ever been put into any practical use or have ever before been used in a hydraulic power transmission device.

It is to be noted that, although so described, I do not limit the application of my hydraulic traction equalizer to automobiles and motor-trucks. It may be used in any system of transmission where it is desirable to allow a relative variation in the speed of two shafts driven from one source of power.

It is also to be noted that modifications may be made in the exact details of the different parts of my invention without changing their function and purpose.

What I claim as new and desire to secure by Letters Patent is:—

1. Intermeshing spur gear pump gears, for hydraulic clutches, and other like mechanisms adapted to transmit power or a rotative movement when interlocked by a liquid medium confined on the compression side thereof, the said gears having teeth with true cylindrical surfaces and having interdental spaces with short parallel surfaces, the said cylindrical surfaces having on their diametrically opposite sides rolling sliding contacts with the said parallel surfaces of the indentations of the companion gear, the intermeshing relation being such that the tooth of one gear comes into contact on opposite sides at the moment an adjacent tooth of the companion gear draws out of contact on its opposite sides.

2. A hydraulic clutch mechanism comprising a power driven rotatable casing having separate liquid-tight gear recesses, two sets of spur gear pump gears arranged in said recesses, and two shafts concentric with and journaled in said casing and attached respectively each to one of the gears of said sets of pump gears, the compression sides and suction sides of said pump gear recesses being respectively in communication and said casing having a storage chamber for liquid communicating with the pump gear recesses at points remote from the regions of compression developed by the functional operation of the pump gears to thereby replenish leakage from said recesses.

3. Intermeshing spur gear pump gears for hydraulic clutches, or other like mechanisms adapted to transmit power or a rotative movement when interlocked by a liquid medium confined on the compression side thereof, the said gears having teeth with cylindrical surfaces on their opposite sides, and having interdental spaces with short parallel surfaces; the said cylindrical surfaces of a tooth of one gear being adapted in the intermeshing movement to fit between the said parallel surfaces of an interdental space of the companion gear.

4. Intermeshing spur gear pump gears for hydraulic clutches or other like mechanisms adapted to transmit power or a rotative movement when interlocked by a liquid medium confined on the compression side thereof, the said gears having teeth with cylindrical surfaces on their opposite sides, and having interdental spaces with short parallel surfaces; the said cylindrical surfaces of a tooth of one gear being adapted in the intermeshing movement to fit between the said parallel surfaces of an interdental space of the companion gear in a rolling sliding plunger piston action, the intermeshing relation being such that the said piston action is continuous, alternating from the withdrawing tooth of one gear to the incoming tooth of the companion gear.

5. Spur gear pumps for hydraulic clutches and the like, comprising a casing and intermeshing spur gears fitting within said casing, said gears having teeth with cylindrical surfaces on their opposite sides and having interdental spaces with short parallel surfaces, the said cylindrical surfaces of the teeth of each gear being adapted in the intermeshing movement to fit between the said parallel surfaces of the interdental spaces of the companion gear, and said casing having suction and discharge ports adjacent the medial line of the intermeshing gears and adapted to communicate with the said interdental spaces as they approach and recede from such line, substantially as described.

6. An interlocking device for hydraulic clutches or like mechanisms, comprising a pair of spur gears, each of said gears having interdental spaces with short parallel surfaces on the opposite sides of each space, and each gear having teeth with cylindrical bearing surfaces adapted, when set in intermeshing relation, to have a journal tight fit between the parallel surfaces in the indentations of the companion gear, a casing having a recess conforming to and enclosing said gears in a journal tight fit therewith, and having ports on opposite sides of and adjacent the medial line of the gears and adapted to communicate with the interdental spaces of said gears as the latter approach and recede from such line, an incompressible liquid medium within said recess, and means for controlling the flow of the liquid medium through said ports whereby the said gears may be interlocked by the liquid medium against intermeshing movement, substantially as described.

7. A hydraulic traction equalizer for automobiles and the like, comprising a rotatable casing adapted to be driven by the motive power of the engine, two traction axles concentric with and projecting from said casing, and two spur gear pumps enclosed in said casing, said pumps having primary gears fixed to said axles and secondary gears eccentrically mounted in said casing on opposite sides of the axis thereof, and said pumps having restricted passages respectively connecting the compression and suction sides thereof.

8. A hydraulic transmission device, comprising a rotatable casing having gear recesses, intermeshing gears in said recesses in close operating fit, a shaft concentric with and journaled in said casing and attached to one of said gears, a liquid medium adapted to fill said gear recesses to interlock the gears against relative rotation in opposite directions, and means for collecting the liquid leaking from said gear recesses and for restoring the same thereto at a point remote from the point of intermeshing of said gears.

9. A hydraulic transmission device, comprising a power driven rotatable pump casing having gear recesses therein, a set of spur gear pump gears arranged in said recesses in close operating fit, a shaft concentric with and journaled in said casing and attached to one of said pump gears, a liquid medium adapted to fill said gear recesses, means for controlling the flow of the liquid medium to thereby interlock the gears against relative rotation in opposite directions, a storage chamber adapted to receive the liquid leaking from said recesses, and means for returning the liquid from said storage chamber to said recesses at points remote from the regions of compression developed by the functional operation of said pump gears.

10. In a hydraulic clutch or other mechanism in which a hydraulic pressure is developed, the combination of a casing having gear recesses therein and intermeshing gears arranged in close operating fit within said recesses, said gears having teeth with substantially cylindrical surfaces on their opposite sides and having interdental spaces with short substantially parallel surfaces on their opposite sides, the teeth of each gear, in the intermeshing movement, being adapted to enter the interdental spaces of the companion gear in piston-like fashion and with a substantially liquid-tight fit between the said surfaces of the teeth and spaces, and said casing having a fluid passage arranged to communicate with the interdental spaces during the piston-like movement of the teeth into the same.

11. In a hydraulic clutch or other mechanism in which a hydraulic pressure is developed, the combination of a casing having gear recesses therein and intermeshing spur gears arranged in close operating fit within said recesses, said gears having teeth provided with flattened ends and substantially cylindrical surfaces on their opposite sides and having interdental spaces with short substantially parallel surfaces on their opposite sides, the teeth of each gear, in the intermeshing movement, being adapted to enter the interdental spaces of the companion gear in piston-like fashion with said substantially cylindrical and parallel surfaces of the teeth and spaces in close operating fit, and said casing having a fluid passage opening through the side walls of said gear recesses adjacent the medial line of the gears and arranged to communicate with each of said interdental spaces during the piston-like movement of the teeth into the same.

WILLIAM S. WESTON.